United States Patent
Tan et al.

(10) Patent No.: US 10,963,674 B2
(45) Date of Patent: Mar. 30, 2021

(54) UNSUPERVISED LEARNING OF OBJECT RECOGNITION METHODS AND SYSTEMS

(71) Applicant: NovuMind Limited, Grand Cayman (KY)

(72) Inventors: Kar Han Tan, Santa Clara, CA (US); Ren Wu, Santa Clara, CA (US)

(73) Assignee: NovuMind Limited, Grand Cayman (KY)

(*) Notice: Subject to any disclaimer, the term of this patent is extended or adjusted under 35 U.S.C. 154(b) by 113 days.

(21) Appl. No.: 16/349,456

(22) PCT Filed: Jan. 2, 2018

(86) PCT No.: PCT/US2018/012079
§ 371 (c)(1),
(2) Date: May 13, 2019

(87) PCT Pub. No.: WO2018/126270
PCT Pub. Date: Jul. 5, 2018

(65) Prior Publication Data
US 2020/0193141 A1 Jun. 18, 2020

Related U.S. Application Data

(60) Provisional application No. 62/441,488, filed on Jan. 2, 2017.

(51) Int. Cl.
*G06K 9/00* (2006.01)
*G06T 7/11* (2017.01)
(Continued)

(52) U.S. Cl.
CPC ..... *G06K 9/00201* (2013.01); *G06K 9/00771* (2013.01); *G06K 9/6256* (2013.01);
(Continued)

(58) Field of Classification Search
CPC .......... G06K 9/00671; G06K 9/00288; G06K 9/00335; G06K 2209/21; G06K 9/00677;
(Continued)

(56) References Cited

U.S. PATENT DOCUMENTS

2016/0057446 A1* 2/2016 Tusch ................. G06T 3/40
375/240.08
2016/0180151 A1* 6/2016 Philbin ............... G06K 9/6218
382/118

* cited by examiner

*Primary Examiner* — Ajibola A Akinyemi
(74) *Attorney, Agent, or Firm* — Patent Masters LLC; Rui Wu

(57) ABSTRACT

Processes and systems are directed to training a neural network of an object recognition system. The processes and systems record video streams of people. Sequences of object images are extracted from each video stream, each sequence of object images corresponding to one of the people. A triplet comprising an anchor feature vector and a positive feature vector of the same object and a negative feature vector of a different object of feature vectors are formed for each sequence of object images. The anchor, positive, and negative feature vectors of each triplet are separately input to the neural network to compute corresponding output anchor, positive, and negative vectors. A triplet loss function value computed from the output anchor, positive, and negative vectors. When the triplite loss function value is greater than a threshold, the neural network is retrained using the anchor and positive feature vectors of the sequences of object images.

21 Claims, 17 Drawing Sheets

(51) Int. Cl.
*G06K 9/62* (2006.01)
*G06N 3/08* (2006.01)
(52) U.S. Cl.
CPC ............. *G06N 3/084* (2013.01); *G06N 3/088* (2013.01); *G06T 7/11* (2017.01); *G06T 2207/20081* (2013.01); *G06T 2207/20084* (2013.01); *G06T 2207/20132* (2013.01)
(58) Field of Classification Search
CPC ............... G06K 9/209; G06K 9/00718; G06K 9/00355; G06K 9/00362; G06K 2209/27; G06K 9/4676; G06K 9/6217; G06K 9/6267; G06K 2209/25; G06K 9/00201; G06K 9/00664; G06K 9/4604; G06K 7/10366; G06K 9/00208; G06K 9/00221
USPC ....................................................... 382/156
See application file for complete search history.

UNSUPERVISED LEARNING OF OBJECT RECOGNITION METHODS AND SYSTEMS

CROSS-REFERENCE TO RELATED APPLICATION

This application claims the benefit of Provisional Application No. 62/441,488 filed on Jan. 2, 2017.

TECHNICAL FIELD

The present disclosure is directed to object recognition, and in particular, to unsupervised learning computational systems and methods for performing object recognition in images obtained from video streams.

BACKGROUND

Typical object recognition methods use machine learning algorithms that, in turn, require extremely large numbers of object images to train the learning algorithms. For example, a typical facial recognition method may require as many as 100 to 200 million training facial images, each facial image labelled with one of around eight million unique identities. These large collections of image data require significant time and large amounts of data storage to collect, label, and store images, which has become a barrier to building and training improved and reliable facial recognition methods.

Some facial image sets that are used to train facial recognition methods are publicly available, but are not representative of facial images of ordinary people. For example, certain facial recognition methods use publicly available images of celebrities and public figures, such as actors, actresses, politicians, and political activists, crawled from web pages to train facial recognition methods. However, facial images of celebrities and public figures are not representative of faces of ordinary people, because many celebrities have distinctive facial features, the facial images may be altered before uploading to the web, and celebrities and public figures are typically professionally photographed. Using facial images of celebrities and public figures that have been crawled from the web to train facial recognition methods creates a mismatch between identification of facial images of celebrities and public figures and identification of ordinary people. In other words, training facial recognition methods with facial images of celebrities and public figures lowers the performance of these facial recognition methods when these same trained methods are employed to recognize facial images of ordinary people. Those working in the object recognition industry seek object recognition methods and systems that require far less image data and avoid training with stock images, such as facial images of celebrities and public figures.

DETAILED DESCRIPTION

Object recognition processes and systems described herein train an existing neural network using object image data collected during actual operation of the object recognition process or system. Object recognition processes and systems eliminate the need for large labelled image data sets, which are expensive to store and maintain and time consuming to build. A neural network is initially trained with stock images. Object recognition processes and systems described herein further improve these neural networks with unsupervised learning. Unlike typical object recognition methods, the object recognition processes and systems are also self-learning, adapt to local populations, and improve over time, unlike current object recognition methods.

In the following discussion, object recognition processes and systems are described with reference to unsupervised learning applied to neural networks trained for facial recognition using video streams. However, these same object recognition processes and systems are not limited to unsupervised learning applied to neural networks configured to recognize individual human faces from video streams but can also be used to perform unsupervised learning applied to any neural network configured to recognize a particular type of object. For example, the objects recorded in the video streams can be different breeds of animals (e.g., breeds of dogs, breeds of cats, breeds of horses, etc.), models of automobiles, bicycles, and motorcycles. The object recognition processes and system retrains a neural network to recognize particular people, dogs, cats, or particular motor vehicles.

Figure 1:
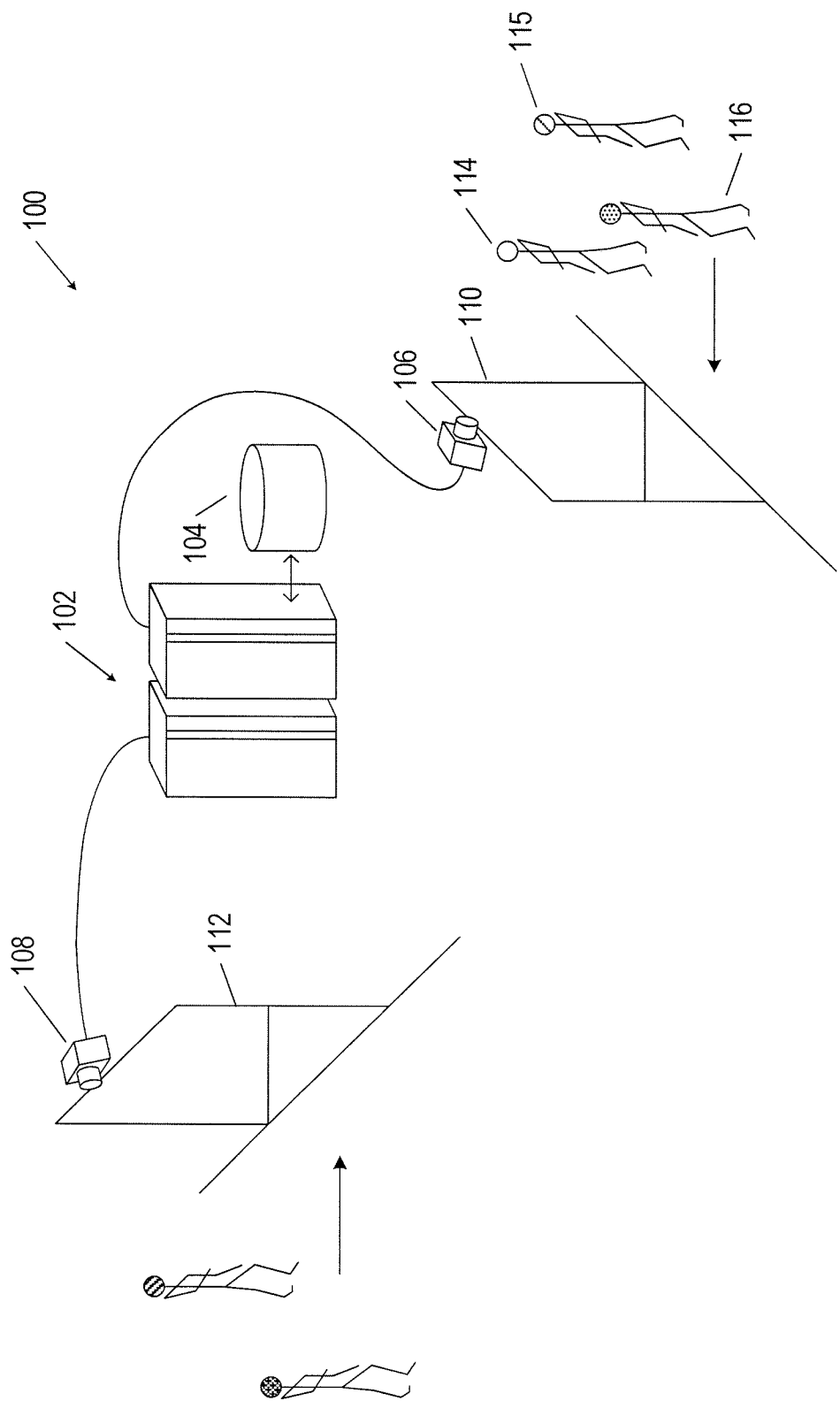
FIG. 1 shows an example of an object recognition system.

FIG. 1 shows an example of an object recognition system 100. The object recognition system 100 comprises a computer system 102, connected data-storage device 104, and two video cameras 106 and 108. In the example of FIG. 1, the video cameras 106 and 108 are located above doorways 110 and 112, respectively, to record video streams of people, and in particular, video streams of people's faces moving toward the doorways. In FIG. 1, and in subsequent figures, differently shaded circles are used to distinguish unique individuals. For example, FIG. 1 shows three people 114-

116 approaching the doorway 110. The three people 114-116 are distinguished by the different head shading patterns. Different shading patterns are also used in subsequent figures to distinguish the different faces capture in the videos by the video cameras. The video streams are transmitted to the computer system 102 and recorded in the data-storage device 104. For example, the video cameras 106 and 108 may be located above doorways at different entrances to the same building to record separate video streams of people entering the building. Alternatively, the video cameras 106 and 108 may be located above doorways at entrances to two buildings at different locations, such as two different cities or two different countries. The object recognition system is not limited to two video cameras. In other implementations, the object recognition system 100 may have any number of video cameras ranging from a single video camera up to ten or more video cameras that each transmit a separate video stream to the computer system 102, where each video stream is recorded in the data-storage device 104.

Figure 2:
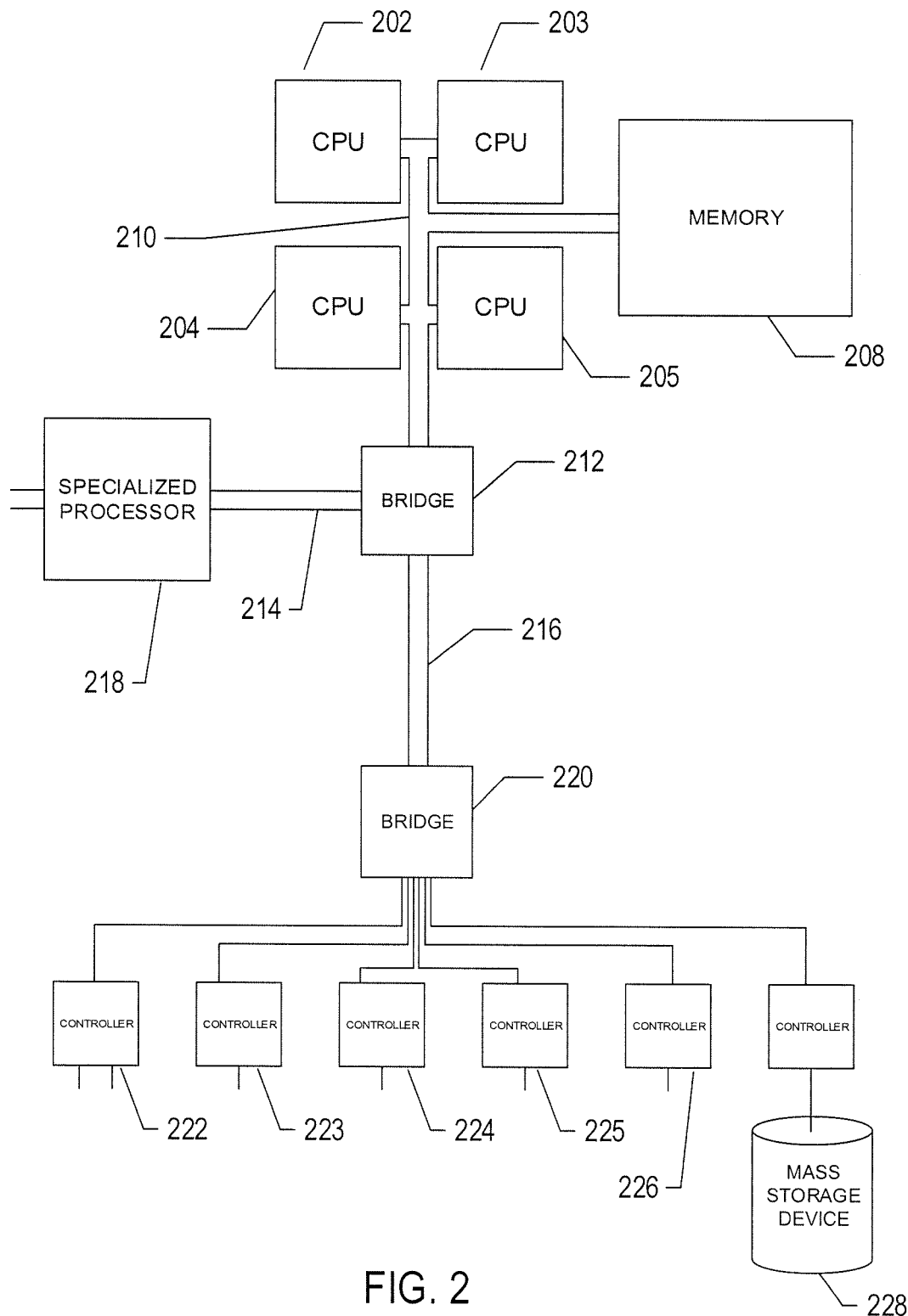
FIG. 2 shows an example of a computer system that executes efficient methods for facial recognition.

FIG. 2 shows an example of a computer system that executes efficient methods for facial recognition. The internal components of many small, mid-sized, and large computer systems as well as specialized processor-based storage systems can be described with respect to this generalized architecture, although each particular system may feature many additional components, subsystems, and similar, parallel systems with architectures similar to this architecture. The computer system contains one or multiple central processing units ("CPUs") 202-205, one or more electronic memories 208 interconnected with the CPUs by a CPU/memory-subsystem bus 210 or multiple busses, a first bridge 212 that interconnects the CPU/memory-subsystem bus 210 with additional busses 214 and 216, or other types of high-speed interconnection media, including multiple, high-speed serial interconnects. The busses or serial interconnections, in turn, connect the CPUs and memory with specialized processors, such as a graphics processor 218, and with one or more additional bridges 220, which are interconnected with high-speed serial links or with multiple controllers 222-227, such as controller 227, that provide access to various different types of computer-readable media, such as computer-readable medium 228, electronic displays, input devices, and other such components, subcomponents, and computational resources. The electronic displays, including visual display screen, audio speakers, and other output interfaces, and the input devices, including mice, keyboards, touch screens, and other such input interfaces, together constitute input and output interfaces that allow the computer system to interact with human users. Computer-readable medium 228 is a data-storage device, including electronic memory, optical or magnetic disk drive, USB drive, flash memory and other such data-storage device. The computer-readable medium 228 can be used to store machine-readable instructions that encode the modules and routines of the computational methods described above and can be used to store encoded data, during store operations, and from which encoded data can be retrieved, during read operations, by computer systems, data-storage systems, and peripheral devices.

Figure 3:
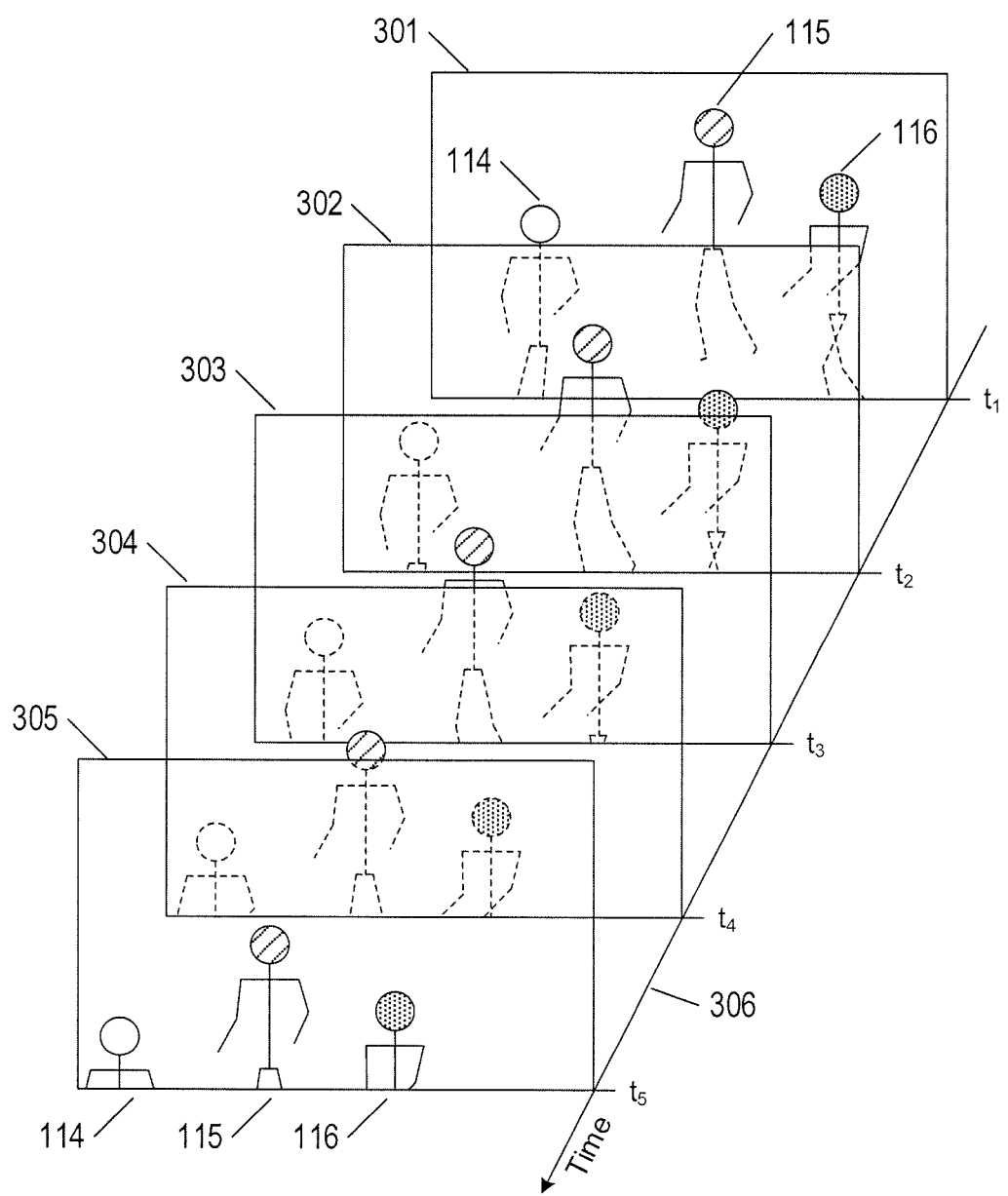
FIG. 3 shows an example sequence of five consecutive video frames of a video stream generated by a video camera shown in FIG. 1.

Returning to FIG. 1, the video cameras 106 and 108 may be activated at different times during the day to record video streams of people passing through the doorways 110 and 112, such as during peak time periods. Each video stream comprises a sequence of video frames. Each video frame captures a still image of moving objects at a point in time. FIG. 3 shows an example sequence of five consecutive video frames 301-305 of a video stream generated by the video camera 106 in FIG. 1 as three people 114-116 approach the doorway 110. FIG. 3 includes a time line represented by directional arrow 306. Each video frame has a time stamp. Video frame 301 is a still image captured at time $t_1$ of the people 114-116 far from the doorway and video frame 305 is a still image captured at a later time $t_5$ of the same people 114-116 closer to the doorway.

Figure 4:
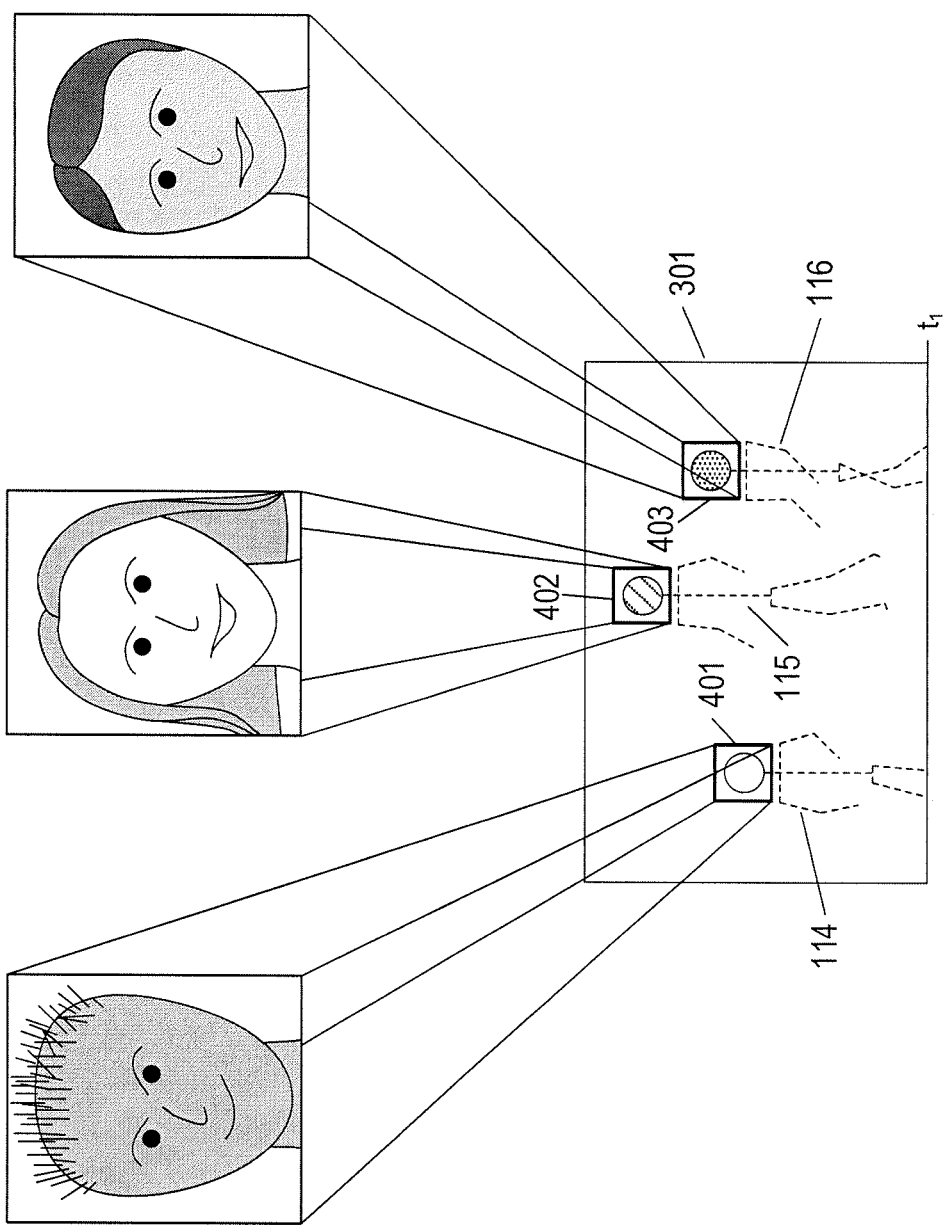
FIG. 4 shows facial images of three people captured in a video frame using face detection.

After a video stream has been recorded over a period of time, face detection is carried out to isolate one or more facial images in each video frame. For example, the Viola-Jones object detection using Haar features may be used to determine one or more facial images within each video frame of the sequence of video frames. Human faces have similar facial features, such as an eye region that appears dark, a nose bridge that is brighter than the eye region, and a gradient of pixel intensities that are used to identify the faces of different people appearing in the same video frame. FIG. 4 shows facial images 401-403 of the three people 114-116, respectively, captured in the video frame 301 using face detection. Each facial image is a cropped facial image outlined by a rectangle that encloses the face of each person in the video frame. FIG. 4 includes exploded views of the facial images 401-403. In order for face detection to operate properly, the entire face points in the direction of the video camera and should not be tilted away from the video camera. In the example of FIG. 4, each facial image is a full frontal-view of an upright face pointed toward the video camera.

Figure 5:
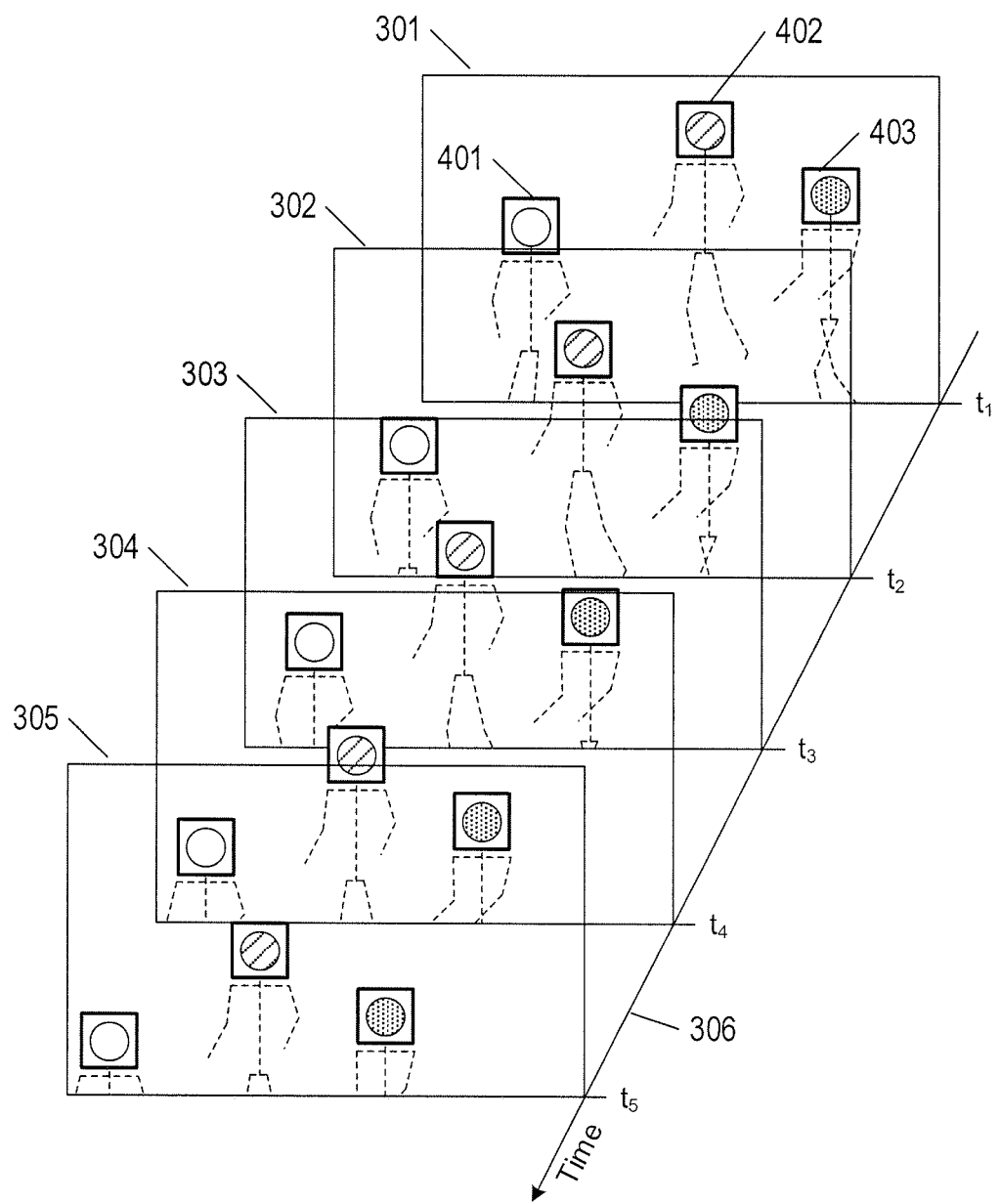
FIG. 5 shows an example of facial images detected in each video frame of five consecutive video frames.

FIG. 5 shows an example of facial images detected in each video frame of the five consecutive video frames 301-305. Face tracking may be applied to the facial images in each video frame in order to form a sequence of tracked faces for each person captured in the video stream. In one implementation, face tracking is carried out by identifying feature points in the facial images of a first video frame of a sequence of video frames.

Figure 6:
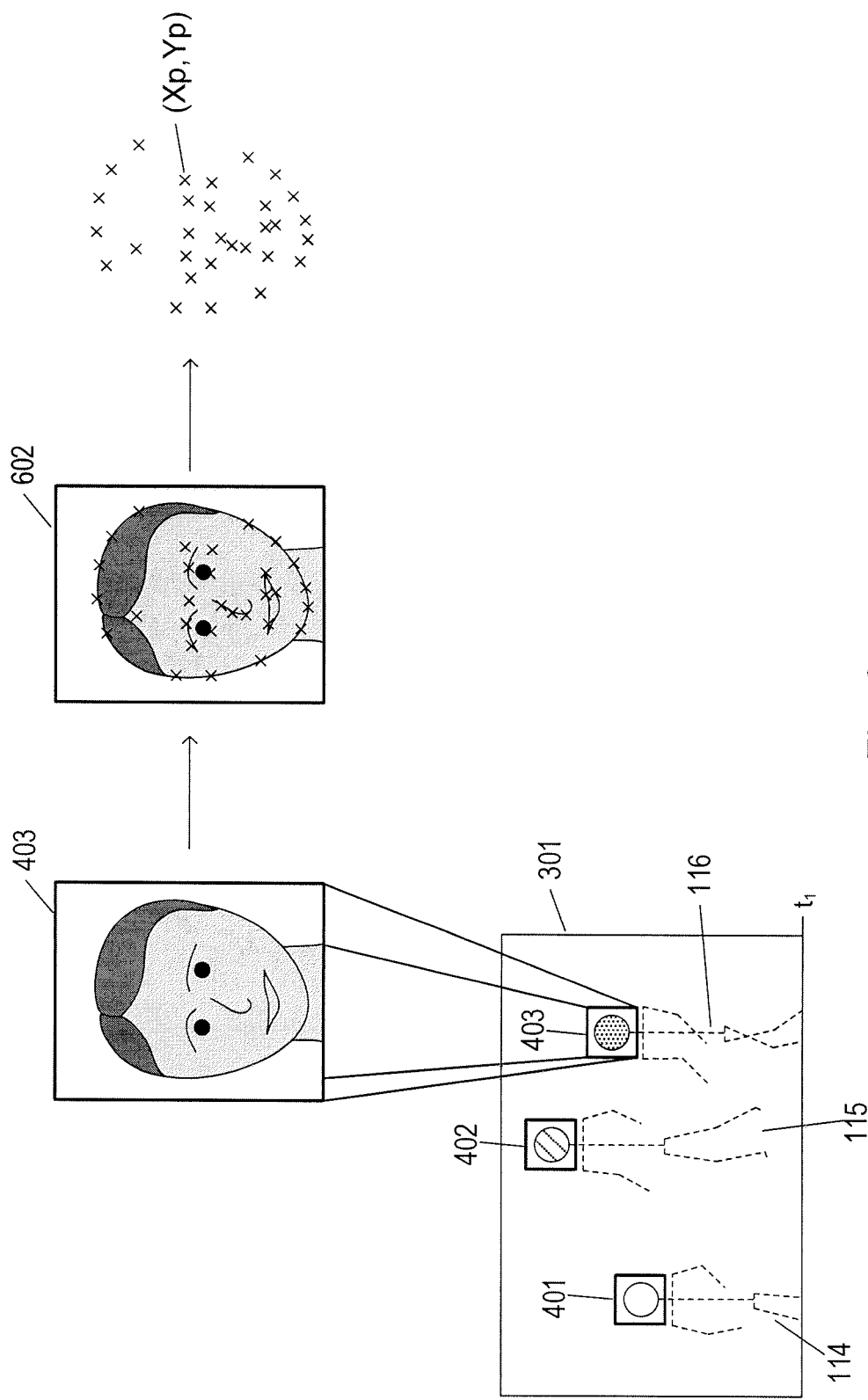
FIG. 6 shows a first video frame of the sequence of video frames and facial images of three people.

FIG. 6 shows the first video frame 301 of the sequence of video frames and facial images 401-403 of the three people 114-116. Each feature point is a pixel in the facial image where a large change in pixel values between neighboring pixels occur. For example, edges of the face, nose, eyes, and lips are places in the facial image where large changes in pixel values occur. Each feature point is identified as a pixel coordinate in the facial image. Facial image 602 represents the facial image 403 with feature points identified by X's that correspond to pixels located at edges of the face, nose, eyes, and lips of the person's face shown in the facial image 403. Each feature point is a pixel coordinate $(x_p, y_p)$ in the video frame 301. The set of feature points of one facial image in a video frame are expected to have a similar set of feature points of one of the facial images in a next video frame. Hence, the feature points identified in facial image 602 form a set of feature points 604 that may be used to identify which facial image in a next video frame corresponds to the same person.

Figure 7:
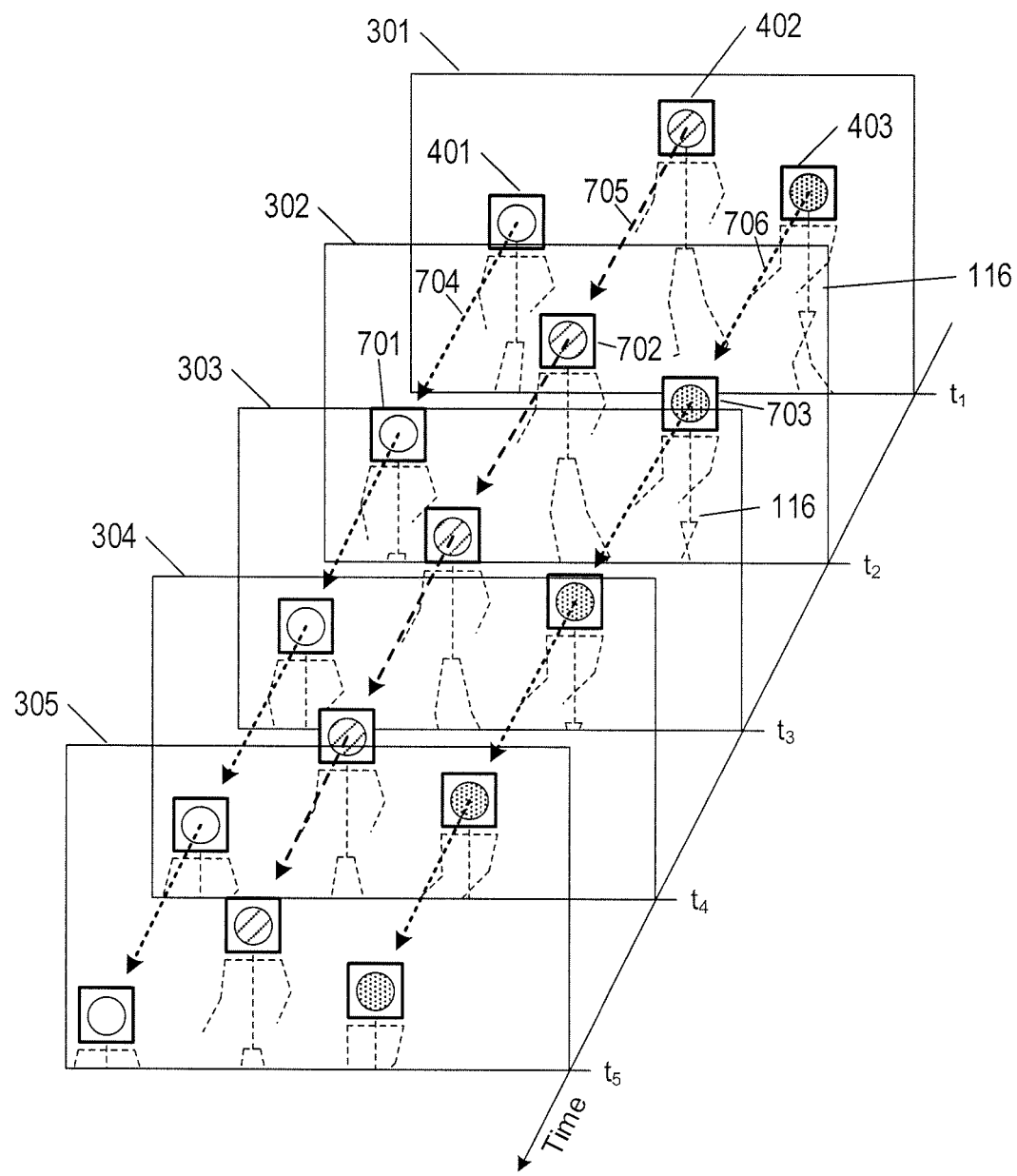
FIG. 7 shows an example of face tracking in a sequence of video frames of FIG. 5.

FIG. 7 shows the sequence of video frames 301-305 with facial images identified in each video frame as described above with reference to FIG. 5. In one implementation, a set of feature points may be determined for each facial image in each video frame. For example, a set of feature points may be determined for each of the facial images 701-703 in the video frame 302. The facial image of the facial images 701-703 with a set of feature points that are located closest to the set of feature points of one of the facial image 401-403 are assumed to be facial images of the same person. For example, the set of feature points of the facial image 403 are expected be similar to the set of feature points of the facial image 703. As a result, the facial images 403 and 703 are assumed to be of the same person 116. In another implementation, the video frames may be close enough in time that two facial images in consecutive video frames are assumed to be of the same person if at least a fraction of the feature points of one of the two facial images are located within the boundaries of the other facial image. For example, at least a faction of the feature points of the facial image 403 are located within the boundary of the facial image 703 and are not located with the boundaries of the facial images 701 and 702. In another implementation, central pixels of the facial images 401-403 of the video frame 301 may be determined and the central pixels of the facial images 701-703 of the next video frame 302 may be determined. Distances between the central pixels of the facial images 401-403 and the central pixels of the facial images 701-703 are calculated. The two facial images with the shortest distance between central pixels are assumed to be of the same person. For example, the central pixels of the facial images 403 and 703 in consecutive video frame 301 and 302, respectively, would have the smallest distance and are consecutive facial images of the same person 116.

Differently patterned directional arrows, such as directional arrows 704-706, represent sequences of tracked facial images of the people 114-116 for the sequence of video frames 301-305. In other words, each sequence of tracked facial images are facial images of the same person. The facial images are extracted from each video frame and are separately stored in the data-storage device as separate sequences of tracked facial images.

Figure 8:
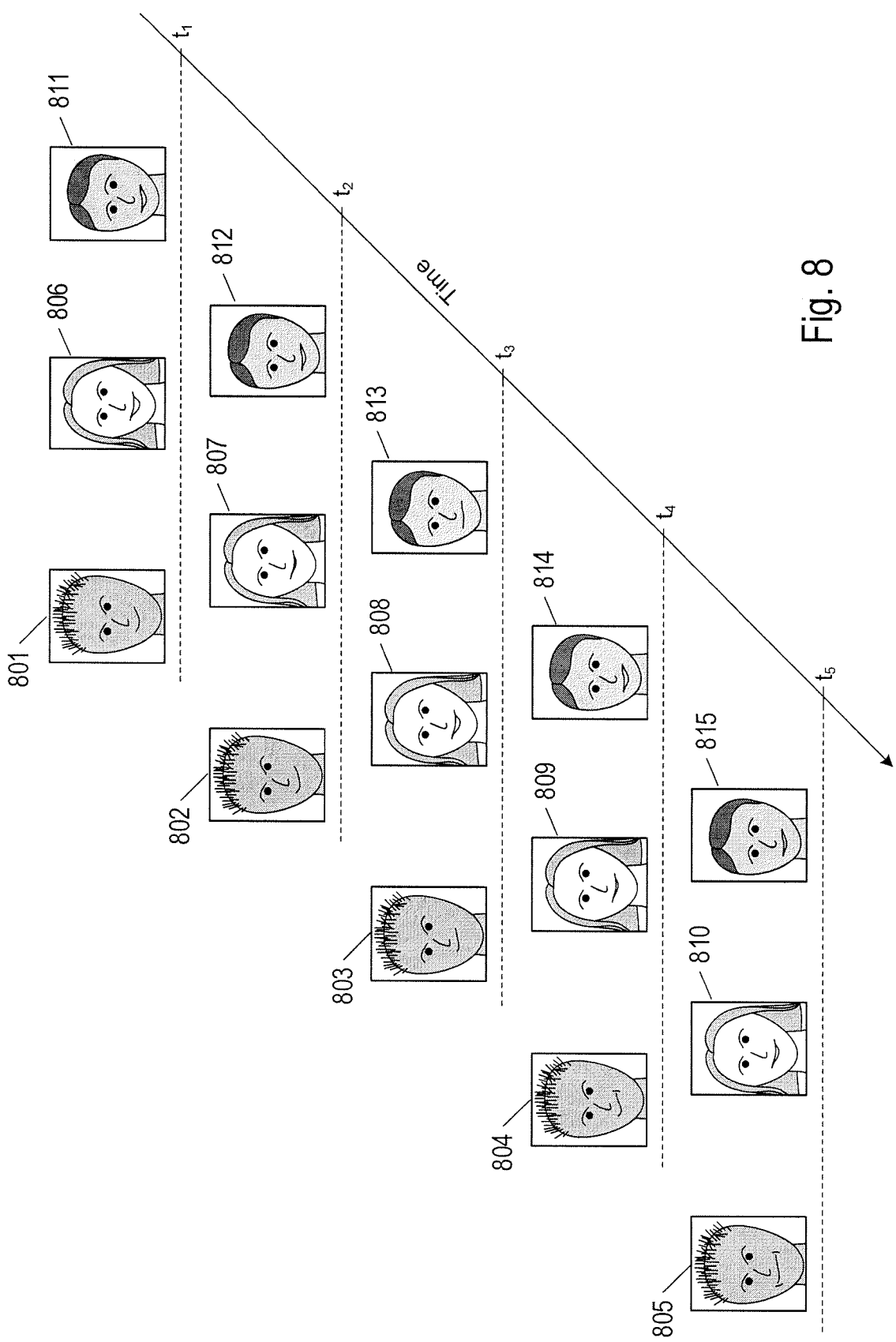
FIG. 8 shows examples of three sequences of tracked facial images.

FIG. 8 shows examples of three sequences of tracked cropped facial images. Cropped facial images 801-805 represent a sequence of facial images of the person 114 extracted from the video frames 301-305. Cropped facial images 806-810 represent a sequence of facial images of the person 115 extracted from the video frames 301-305. Cropped facial images 811-815 represent a sequence of facial images of the person 116 extracted from the video frames 301-305.

Sequences of facial images may be formed from video streams of people captured over the same period of time but with video cameras at different locations, such as video streams of people recorded over the same period of time at different doorways to the same building or doorways of buildings at different geographical locations. A group of sequences of facial images is selected based on a period of time within which the cropped facial images are recorded or physical distance. As a result, the sequences of facial images cropped from video streams captured at different locations and during the same period of time ensures that each sequence of facial images is associated with a unique individual. For example, two faces captured in the same video frame correspond to two different people, or two faces captured in video frames of two different video streams recorded at different locations and at approximately the same time also correspond to two different people.

Figure 9:
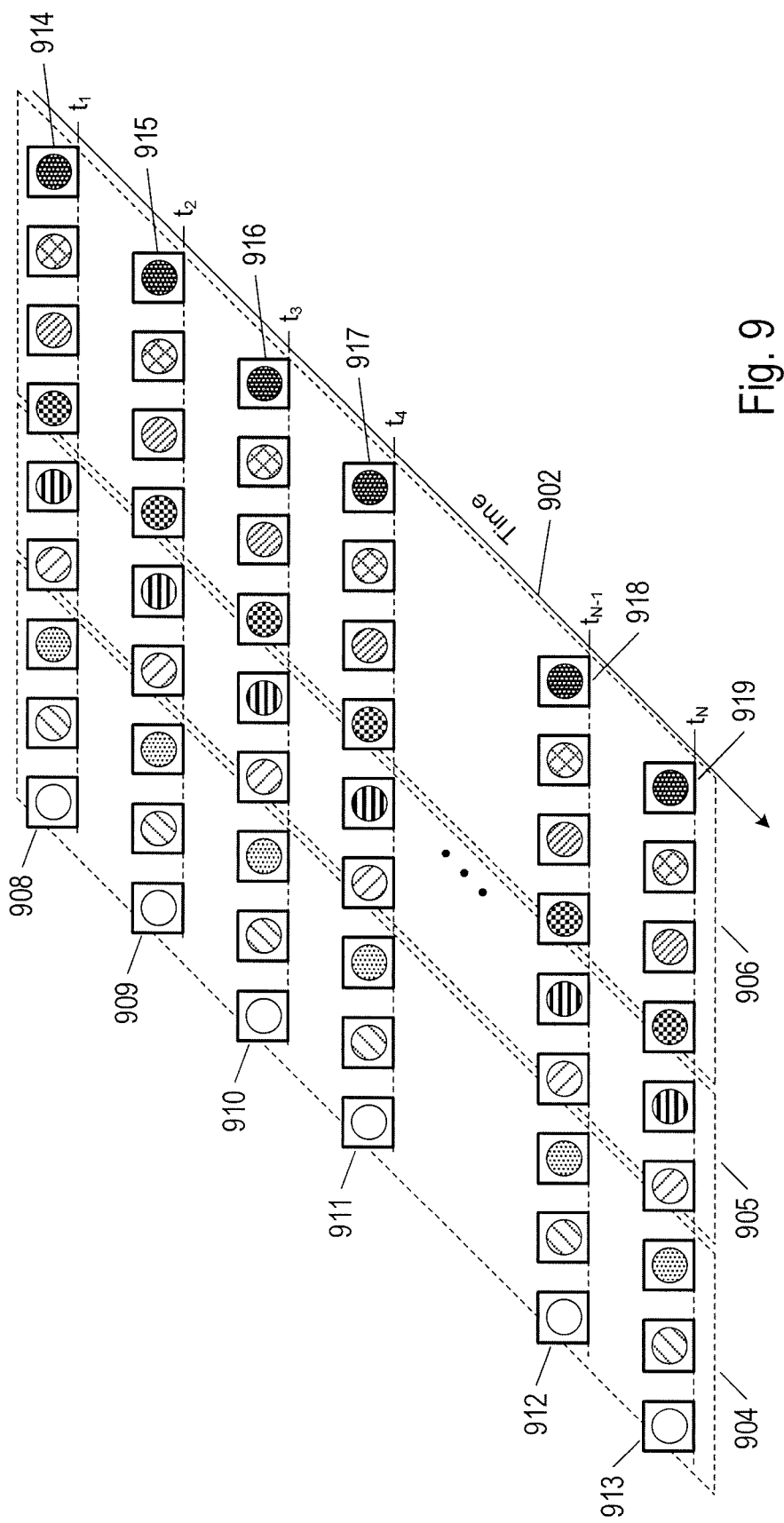
FIG. 9 shows an example group of sequences of facial images collected over a period time.

FIG. 9 shows example group of sequences of facial images collected over the same period of time for nine people. Directional arrow 902 represents a time axis. The sequences of facial images are extracted from three different video streams over the same period of time $[t_1, t_N]$. Dashed-line rectangles 904-906 encompass sequences of facial images from three different video streams captured with three different video cameras located at different locations. For example, cropped facial images 908-913 represent a first sequence of facial images extracted from a video stream captured with a video camera at one location while cropped facial images 914-919 represent a second sequence of facial images extracted from a video stream captured with a video camera at a second location. Because the sequences of facial images are recorded over the same period of time but at different locations, each sequence of facial images corresponds to a unique person.

Figure 10:
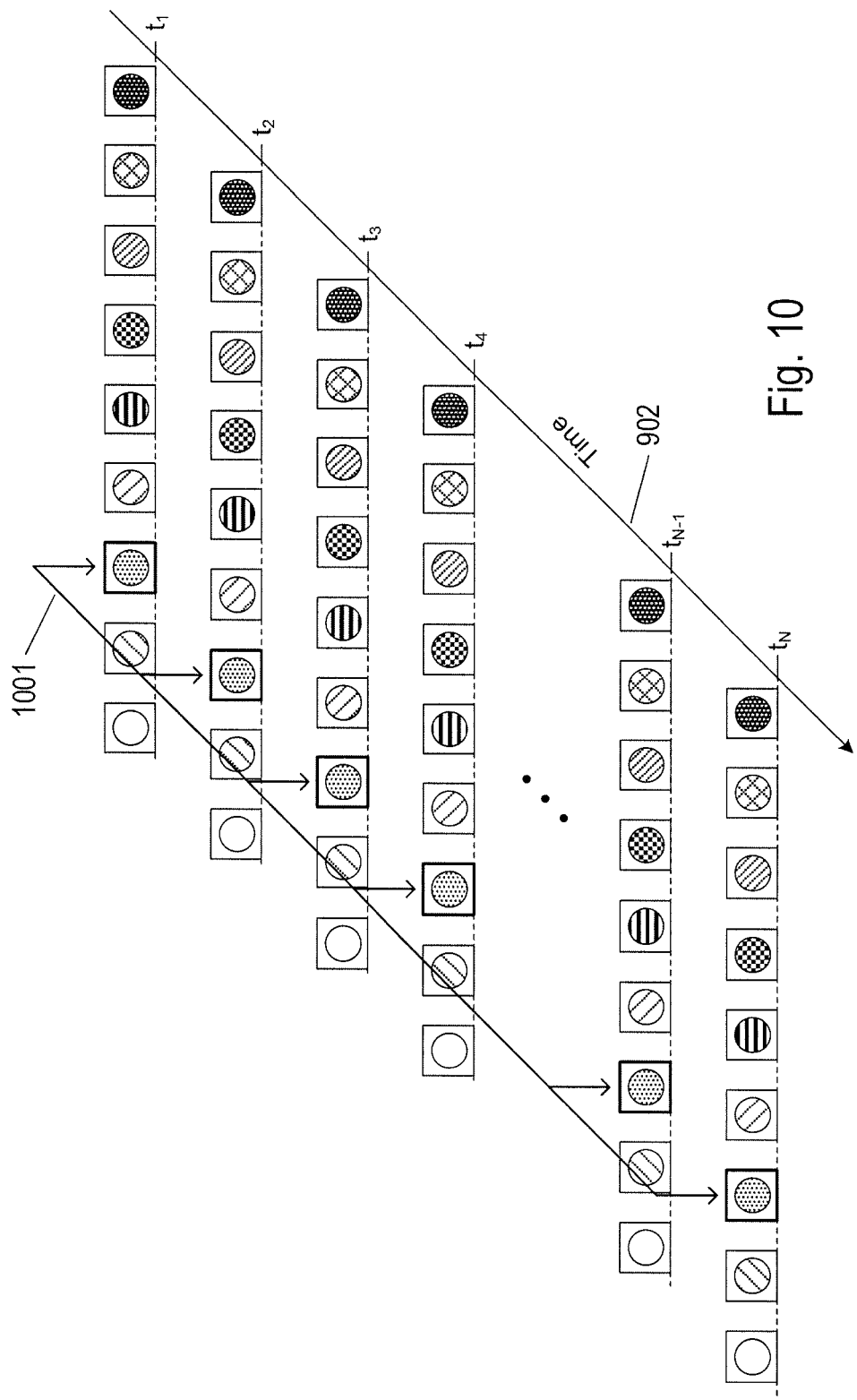
FIG. 10 shows a sequence of facial images randomly selected from a group of sequences of facial images.

A sequence of facial images is randomly selected from the group of sequences of facial images. FIG. 10 shows a sequence of facial images 1002 that has been randomly selected from the group of nine sequences of facial images.

Figure 11:
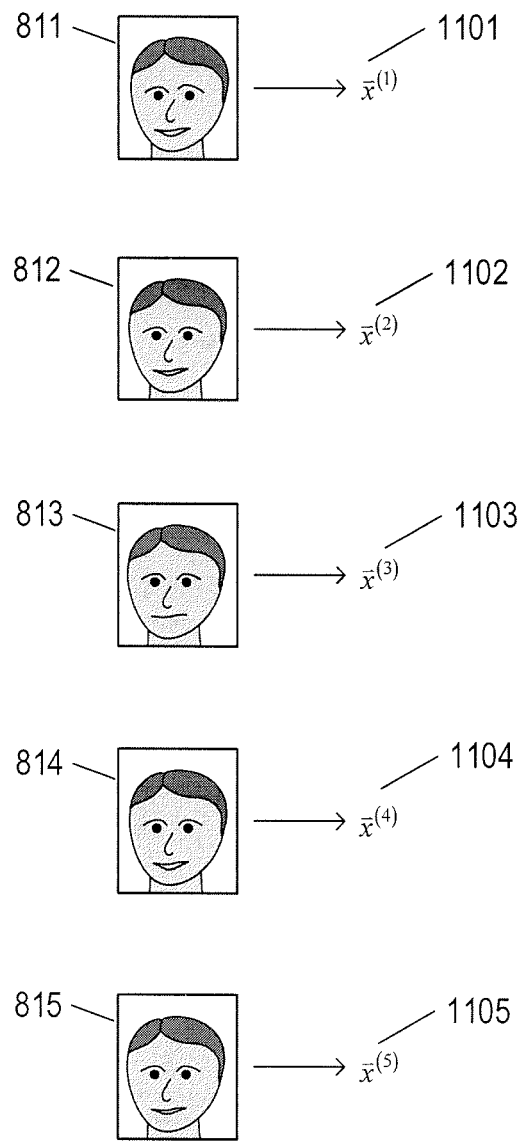
FIG. 11 shows examples of image data formed from pixels of cropped facial images shown in FIG. 8.

FIG. 11 shows examples of image data 1101-1105 formed from pixels of the cropped facial images 811-815 of the sequence of five facial images shown in FIG. 8. Each set of image data is formed in the same manner from pixel intensities, such as three neighboring pixel intensities 1106. The image data of the cropped facial image 811 is represented by a 2D (monochrome) or 3D (color) vector/tensor denoted by $\vec{x}^{(1)}$. A facial image is randomly selected from the randomly selected sequence of facial images and identified as the "anchor facial image." The image data of the anchor facial image is represented by a 2D (monochrome) or 3D (color) vector/tensor denoted by $\vec{x}^a$. A distance between the anchor facial image $\vec{x}^a$ and each facial image in the same sequence of facial images is computed as follows:

$$\{d(\vec{x}^a, \vec{x}^{(j)}); j=1, \ldots, J \text{ and } (j) \neq a\} \qquad (1)$$

where

J is the number of facial images in the sequence of facial images; and $d(\vec{x}^a, \vec{x}^{(j)}) = \|\vec{x}^a - \vec{x}^{(j)}\|$ is a norm.

The facial image in the sequence of facial images with a maximum distance from the anchor facial image is called the "positive facial image." The image data of the positive facial image is represented by a 2D (monochrome) or 3D (color) vector/tensor denoted by $\vec{x}^p$. The maximum distance between the anchor and positive faction images is defined as follows:

$$d(\vec{x}^a, \vec{x}^p) = \max\{d(\vec{x}^a, \vec{x}^{(j)}); j=1, \ldots, J \text{ and } (j) \neq a\} \qquad (2)$$

A negative facial image is randomly selected from the group of sequences of facial images but does not belong to the sequence of facial images the positive and anchor facial images belong to. In other words, the negative facial image is of a person that is different from the person captured in the anchor and positive facial images. The image data of the negative facial image is represented by a 2D (monochrome) or 3D (color) vector/tensor denoted by $\vec{x}^n$. The image data of the anchor, positive, and negative facial images form a facial image triplet denoted by $(\vec{x}^a, \vec{x}^p, \vec{x}^n)$.

Figure 12:
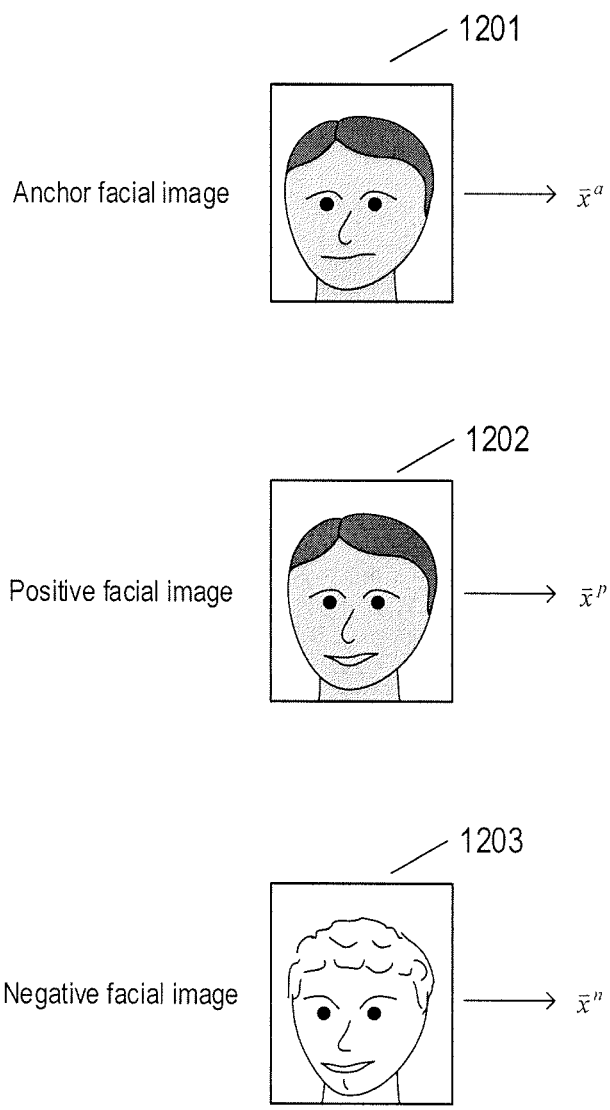
FIG. 12 shows examples of anchor, positive, and negative facial images and associated anchor, positive, and negative image data.

FIG. 12 shows examples of anchor, positive, and negative facial images. The anchor and positive facial images 1201 and 1202 are different facial images of the same person obtained from the randomly selected sequence of facial images, while the negative facial image 1203 is a facial image of a different person. The anchor, positive, and negative facial images 1201-1203 together are a facial image triplet.

Object recognition processes and systems begin by training a neural network for extracting discriminative features from facial images using a labelled facial image data set. Neural networks are a computational modeling technique that changes structure during training and can be used to model complex relationships between an input layer and an output layer.

Figure 13:
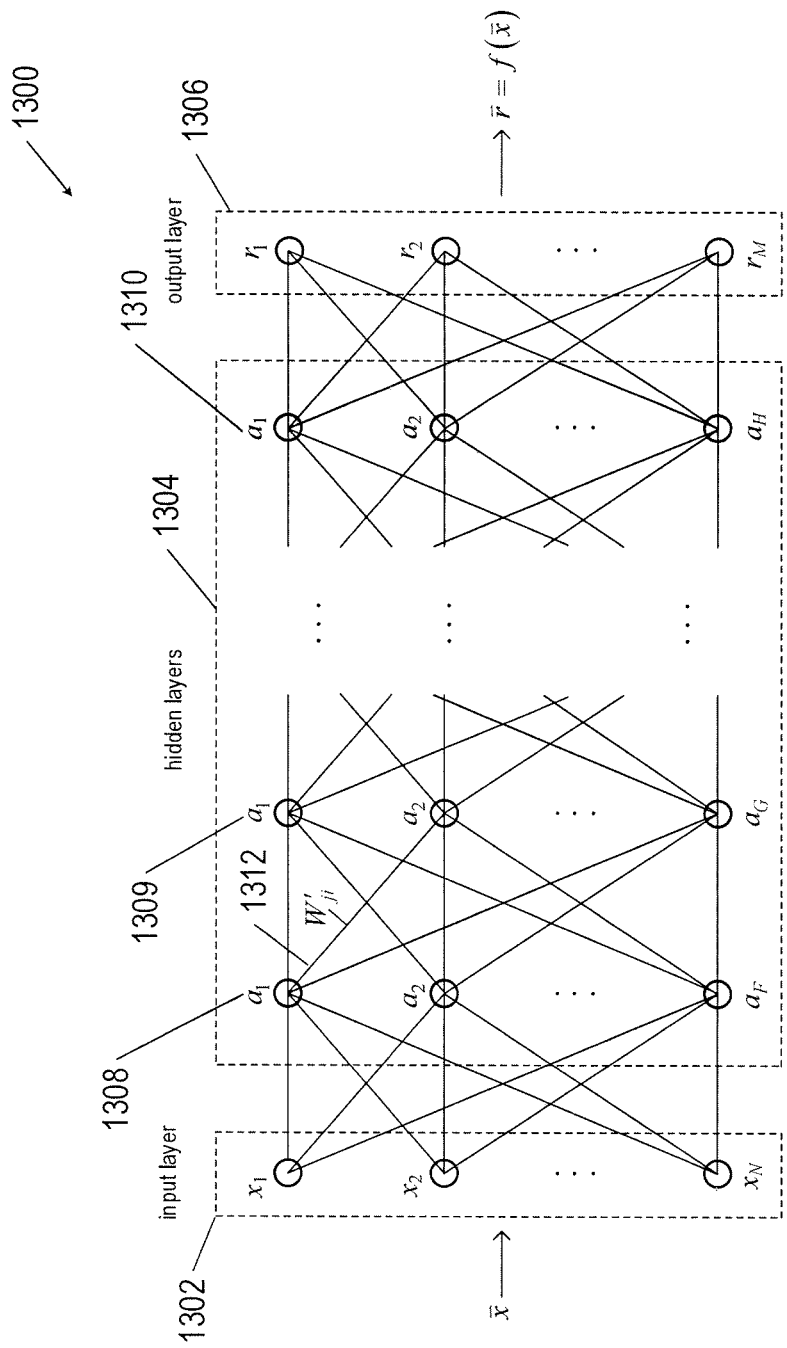
FIG. 13 shows an example neural network.

FIG. 13 shows an example neural network 1300. The neural network 1300 comprises an input layer 1302, numerous hidden layers 1304, and an output layer 1306. The input layer 1302 comprises nodes. Each node of the input layer 1302 corresponds to an element of a cropped facial image represented by a 2D (monochrome) or 3D (color) vector/tensor denoted by $\vec{x}$. For example, the cropped facial image $\vec{x}$ represents the anchor facial image $\vec{x}^a$, the positive facial image $\vec{x}^p$, the negative facial image $\vec{x}^n$, or the image data of an unidentified facial image. In other implementations of the neural network, the input to the neural network may be a subsampled version of the cropped facial image $\vec{x}$. The output layer 1306 comprises a feature vector represented by:

$$\vec{r} = [r_1, r_2, \ldots, r_M] \quad (3)$$

where $r_i$ represents the ith output value, and

M represents the number of outputs.

The feature vector $\vec{r}$ may be characterized as vector-valued function of an input image data as follows:

$$\vec{r} = f(\vec{x}) \quad (4)$$

Hidden layers 1304 comprise nodes that represent hidden units denoted by $a_i$. Hidden layer 1308 comprises F nodes that correspond to F hidden units, hidden layer 1309 comprises G nodes the correspond to G hidden units, and hidden layer 1310 comprises H nodes that correspond to H hidden units, where F, G, and H are positive integers. A neural network with more than one hidden layer is called a deep neural network. Pairs of nodes are connected by links or edges, such as link 1312, that represent weights denoted by $W'_{ji}$. Each weight determines the strength and sign of a connection between two nodes. The number of hidden layers can be greater than two, and the number of nodes in each hidden layer is not limited. It should be noted that the number of hidden layers and number of nodes in each hidden layer can be selected for computational efficiency.

A backpropagation training algorithm, such as stochastic gradient descent, is applied to the neural network. The neural network receives as input a 2D (monochrome) or 3D (color) vector/tensor, propagates the results of each layer in the neural network forward until it reaches the final layer, producing a feature vector. The computed feature vector is compared with a desired feature vector by computing an error given by:

$$\text{error} = \|\vec{r}^c - \vec{r}^d\|_2^2$$

where $\|\bullet\|_2^2$ is the square of the L2 norm;

$\vec{r}^c$ is a computed feature vector; and $\vec{r}^d$ is a desired feature vector.

When the error is large (e.g., greater than a threshold) the computed feature vector is significantly different from the desired feature vector and vice versa. The objective of training a neural network is to adjust the weights in the neural network so that the computed feature vector is as close as possible to the desired feature vector, thus minimizing the error.

The backpropagation algorithm used to train the neural network of the object recognition system proceeds in the reverse direction, such as when the feature vector is computed from an input vector. In a backward pass, the backpropagation algorithm computes gradients of the weights of each hidden layer to change the weights based on the difference between the computed feature vector and the desired feature vector. Proceeding in a hidden-layer-by-hidden-layer fashion, a complete set of gradients for adjusting the weights of the neural network can be systematically computed. This set of gradients is then applied to the weights, often with the same adjustments, for example to slow the rate of change and prevent oscillations during the training process. In parallel object recognition systems, multiple copies of the neural network can be used to evaluate different input image data, desired feature vectors, and pairs of input image and feature vectors, each producing a different set of gradients which are then aggregated, for example by averaging the corresponding gradients, before updating the weights of the neural networks parallel object recognition systems.

The neural network 1300 may be trained for a fixed number of iterations using the facial image triplets obtained for a number different people recorded in the video streams. In another implementation, the neural network 1300 is initially trained using a labelled set of facial images. Performance of the neural network 1300 is monitoring and retrained based on the variance in a triplet loss function that minimizes the distances between the anchor and positive feature vectors, while maximizing the distances between the anchor and negative feature vectors. In order to determine when the neural network has to be retrained, Q facial image triplets ($\vec{x}_q^a$, $\vec{x}_q^p$, $\vec{x}_q^n$) are separately input to the neural network to obtain corresponding feature vector triplets denoted by ($f(\vec{x}_q^a)$, $f(\vec{x}_q^p)$, $f(\vec{x}_q^n)$) for Q different people recorded in the one or more video streams, where subscript $q=1, 2, \ldots, Q$. A triplet loss function is computed for each of the feature vector triplets as follows:

$$LF(\vec{x}_q^a, \vec{x}_q^p, \vec{x}_q^n) = \|f(\vec{x}_q^a) - f(\vec{x}_q^p)\|_2^2 - \|f(\vec{x}_q^a) - f(\vec{x}_q^n)\|_2^2 + \alpha \quad (5a)$$

where $\alpha$ is a constant; and $\|\bullet\|_2^2$ is the square of the L2 norm.

The variance of the average of the triplet loss functions for the Q triplet loss functions is computed as follows:

$$\text{Var}(LF) = \frac{1}{Q}\sum_{q=1}^{Q}(LF(\vec{x}_q^a, \vec{x}_q^p, \vec{x}_q^n) - \mu_{LF})^2 \quad (5b)$$

where $$\mu_{LF} = \frac{1}{Q}\sum_{q=1}^{Q}LF(\vec{x}_q^a, \vec{x}_q^p, \vec{x}_q^n)$$

is the average of the triplet loss functions. When the variance of the average of the triplet loss functions computed for the Q feature vector triplets separately input the neural network is greater than a threshold as follows:

$$\text{Var}(LF) > Th \quad (6a)$$

the neural network is retrained using the Q facial image triplets. Otherwise, when the variance of the average of the triplet loss functions satisfies the condition $$\text{Var}(LF) \leq Th \quad (6b)$$

the neural network is not subjected to retraining.

Figure 14:
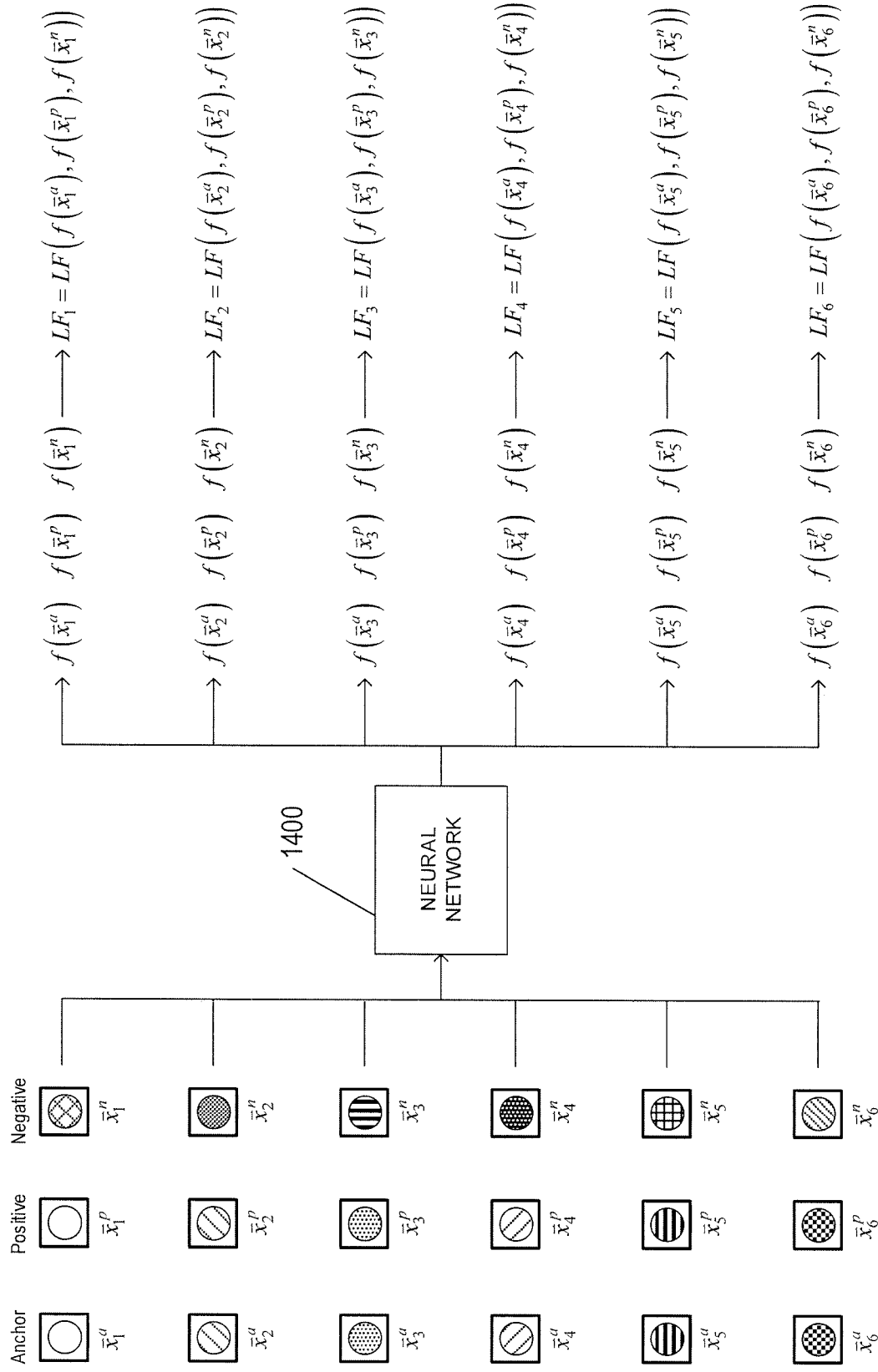
FIG. 14 shows a group of facial image triplets separately input to the same trained neural network.

FIG. 14 shows a group of facial image triplets of cropped facial images that are separately input to the same trained neural network 1400. The neural network 1400 has already been trained for extracting discriminative features from facial images using a labelled facial image data set. A group of six facial image triplets has been determined from one or more video streams as described above with reference to FIGS. 1-12. In the example of FIG. 12, the anchor, positive, and negative facial images are separately input to the neural network 1400 to obtain corresponding anchor, positive, and negative feature vectors. FIG. 14 also shows a triplet loss function computed for each feature vector triplet. When the variance of the average of the triplet loss functions is greater than the threshold as represented by Equation (6a), the neural network is retained using the Q facial images triplets. If the training results in the variance of the average of the triplet loss functions satisfying the condition given by Equation (6b), the neural network may also be tested with benchmarking. If the performance of the neural network improves then the current version of the neural network is updated with the most recently trained version of neural network. Otherwise, the current version of the neural network is retained. Over time, the neural network adapts to a local population captured in the video streams and the recognition accuracy automatically improves without requiring human intervention (i.e., unsupervised learning). For unsupervised learning applied to the neural network as described above, when a newly trained network exhibits lower performance in the benchmark test, the previous version of the neural network is retained for facial recognition.

It should also be noted that training the neural network may worsen performance of the neural network. For unsupervised learning applied to the neural network as described above, a newly trained network with lower performance as demonstrated by the variance increasing above the threshold, the previous version of the neural network is retained.

A benchmark comprises a predefined data set of labelled facial images that can be used to objectively measure the accuracy of the object recognition system. The predefined labelled facial image data sets may be publicly available industry-standard benchmarks. One way to measure accuracy of the object recognition system is to compare each facial image with all others in the facial image data set returning a yes or no answer for each pair. A variance of the average fraction of correct answers is computed as described above with reference to Equation (5b) and may serve as a measure of accuracy for the trained neural network. For example, consider a predefined, labelled facial image data set of 100 million faces. Suppose feature vectors of 200 facial images are separately input to the neural network. The 200 facial images are of people whose facial images are also in the labelled facial image data set. When the variation is greater than a threshold, as described above with reference to Equation (11b), the neural network of the object recognition system is retrained.

In other implementations, the video streams can be objects and the corresponding neural network can be trained for extracting discriminative features of the type of object. Sequences of object images can be created in the same manner described above to obtain sequence of facial images. For example, the neural network can be trained for extracting discriminative features of individual models of motor vehicles and the video streams can be of motor vehicles passing through an entrance of a parking garage or under a bridge. In this example, the anchor and positive images of a randomly selected sequence of object images are of the same motor vehicle and the negative image is of a different model of motor vehicle. Alternatively, the neural network can be trained for extracting discriminative features of individual dogs and the video streams can be of different dog breeds. In this example, the anchor and positive images of a randomly selected sequence of object images are of the same dog and the negative image would be of a different breed of dog.

Figure 15:
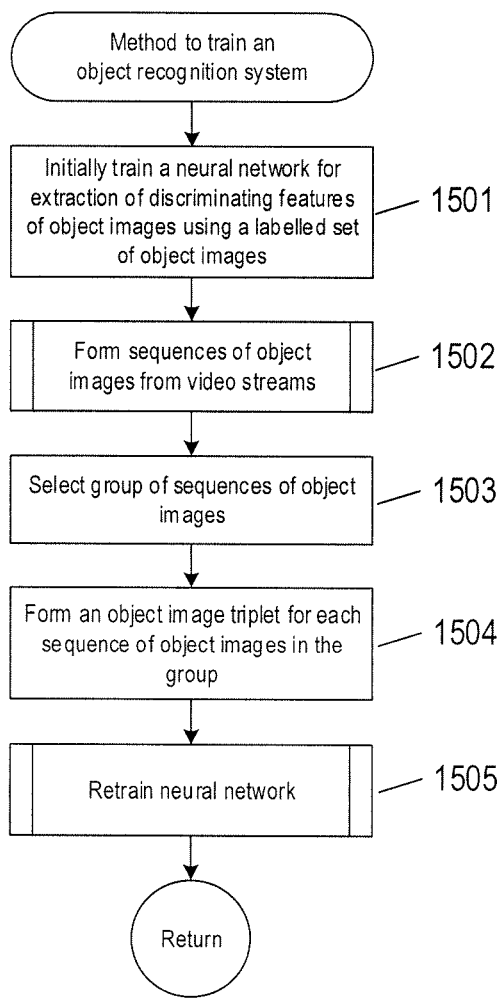
FIG. 15 shows a control flow diagram of an object recognition method.

FIG. 15 shows a control flow diagram of a method to train an object recognition system. In block 1501, a neural network for extraction of discriminating object features of object images is initially trained using a labelled set of object images. In block 1502, a routine "form sequences of object image form video streams" is called. In block 1503, a group of sequences of object images determined in block 1502 is selected. In block 1504, an object image triple is formed for each sequence of object images as described above with reference to FIGS. 10-12. In block 1505, a routine "retrain neural network" is called to retrain the neural network using the object image triplets of the sequences of object images. The object recognition system can then be used to perform object recognition of individual objects captured using the one or more cameras.

Figure 16:
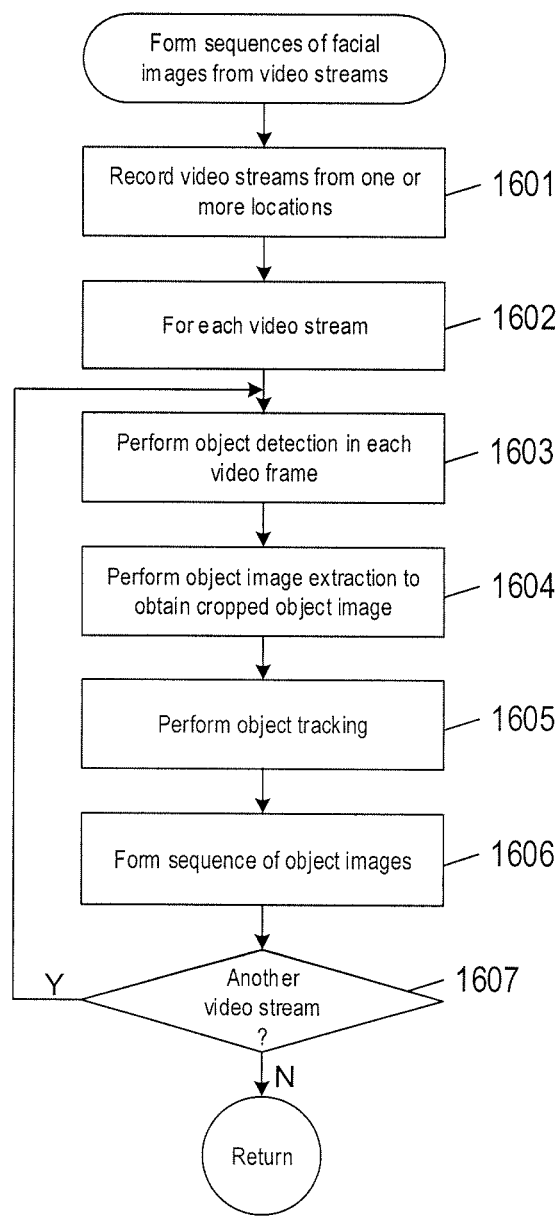
FIG. 16 shows a control flow diagram of the routine "form sequences of object images from video streams" called in FIG. 15.

FIG. 16 shows a control flow diagram of the routine "form sequences of object images from video streams" called in block 1502 of FIG. 15. In block 1601, video streams generated by one or more video cameras in different locations are recorded in a data-storage device over a period of time, as described above with reference to FIGS. 1 and 2. A loop beginning with block 1602 repeats the computational operations represented by blocks 1603-1607 for each video stream. In block 1603, object detection is performed on each video frame of the video stream identify the object, such as faces, as described above with reference to FIGS. 4 and 5. In block 1604, object image extraction is performed to obtain cropped object images in each video frame as describe above with reference to FIG. 5. In block 1605, object tracking is applied to the object images as described above with reference to FIGS. 6 and 7. In block 1606, sequences of object images are formed as described above with reference to FIG. 8 for each different object captured in the video stream. In decision block 1607, blocks 1603-1606 are repeated for another video stream.

Figure 17:
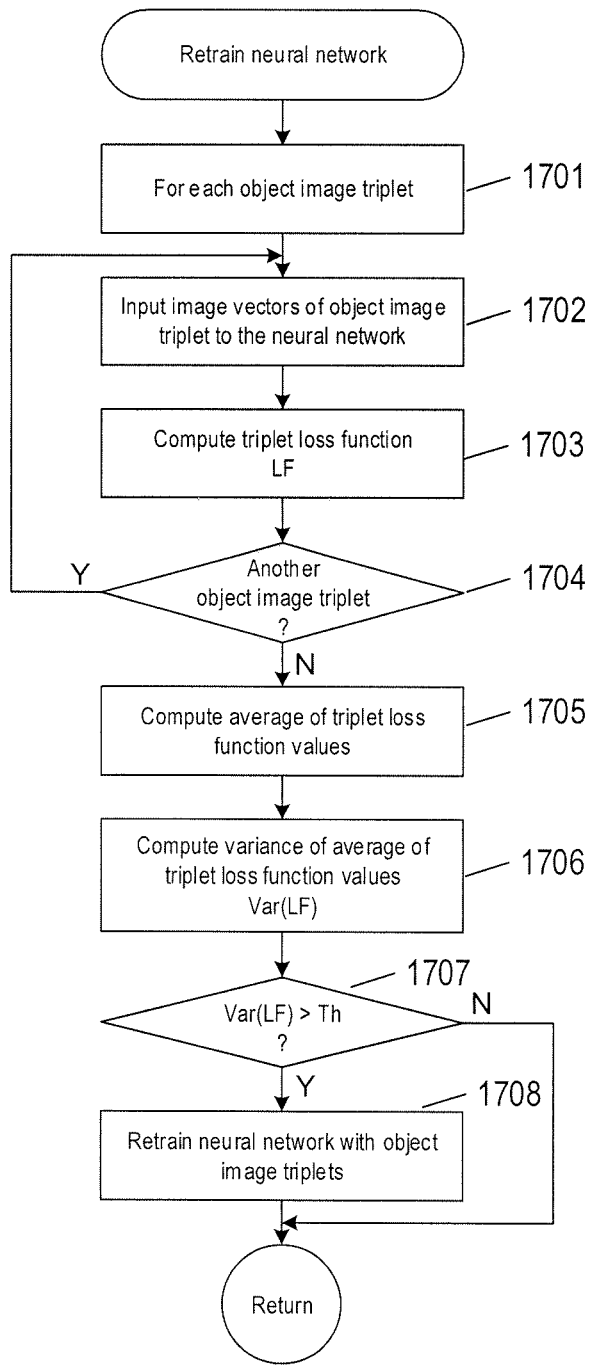
FIG. 17 shows a control flow diagram of the routine "retrain neural network" called in FIG. 15.

FIG. 17 shows a control flow diagram of the routine "retrain neural network" called in block 1505 of FIG. 15. A loop beginning with block 1701 repeats the computational operation of blocks 1702-1703 for each object image triplet. In block 1702, the anchor, positive, and negative images of the object image triplet are separately input to the neural work to obtain a feature vector triplet comprising corresponding anchor, positive, and negative feature vectors as described above with reference to FIG. 14. In block 1703, a triplet loss function value is compute from the feature vector triplet, as described above with reference to Equation (5a). In decision block 1704, the computational operations represented by blocks 1702 and 1703 are repeated for another object image triplet. In block 1705, an average of the triplet loss function values is computed. In block 1706, a variance of the average of the triplet loss function values is computed as described above with reference to Equation (5b). In decision block 1707, when the variance of the average of the triplet loss functions is greater than a threshold, control flows to block 1708. In block 1708, the neural network is retrained with the object image triplets of the sequences of object images.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A process stored in one or more data-storage devices and executed using one or more processors of a computer system to train a neural network of an object recognition system, the process comprising:
   retrieving one or more video streams from the one or more data-storage devices, each video stream capturing one or more views of one or more objects;
   forming one or more sequences of object images, each sequence of object images corresponding to one of the one or more objects;
   forming an object image triplet for each sequence of object images, the object image triplet comprising an anchor object image, a positive object image of the same object and a negative object image of a different object; and
   retraining the neural network using the object image triplet of the sequences of object images, wherein the retraining the neural network comprises:
   for each object image triplet,
      separately inputting the anchor object image, the positive object image, and the negative object image of the object image triplet into the neural network to obtain correspond output anchor, positive, and negative feature vectors,
      computing a triplet loss function value based on the anchor, positive, and negative feature vectors, and
   computing a variance of the triplet loss functions; and
   when the variance of the triplet loss functions is greater than a threshold, retraining the neural network using the anchor, positive, and negative feature vectors of the sequences of object images.

2. The process of claim 1 further comprising capturing the one or more video streams using one or more video cameras over a same period of time, each video camera capturing views of the one or more objects at a different location.

3. The process of claim 1 wherein forming the one or more sequences of object images comprises for each video stream,
   using object detection to identify an object in each video frame of the video stream;
   performing object tracking to track each object captured in the video stream from one video frame of the video stream to a next video frame of the video stream;
   for each object captured in the video stream, using object image extraction to extract a cropped object image from each video frame of the video stream; and
   form a sequence of cropped object images from the extract object images for each object captured in the video stream.

4. The method of claim 1 wherein forming the object image triplet for each of the one or more sequences of object images comprises:
   selecting a first object image from the sequence of object images, wherein the first object image is the anchor object image;
   computing a distance between the anchor object image and each of the images of the sequence of object images;
   identifying the image in the sequence of object images with a largest distance from the anchor object image as the positive object image; and
   form the negative object image from a second object image of object that is different from the object in the sequence of object images.

5. The process of claim 1 further comprises initially training the neural network using a labelled set of object images.

6. The process of claim 1 wherein retraining the neural network using the triplet feature vectors of the sequences of objects images for a fixed number of iterations.

7. The process of claim 1 further comprises:
   inputting object images of objects whose object images are in the labelled object image data set to the neural network to obtain corresponding feature vectors;
   computing an average fraction of correct matches as a measure of how well the neural network of the object recognition system is performing;
   computing a variance of the average fraction of correct matches; and
   when the variance of the average fraction of correct matches is greater than a threshold, retraining the neural network using the object images in the labelled object image data set.

8. An object recognition system, the system comprising:
   one or more video cameras;
   one or more processors;
   one or more data-storage devices; and
   machine-readable instructions stored in the one or more data-storage devices that when executed using the one or more processors controls the system to execute:
      recording one or more video streams, each video stream capturing views of one or more objects using one of the one or more video cameras;
      forming one or more sequences of object images, each sequence of object images corresponding to one of the one or more objects;
      forming an object image triplet for each sequence of object images, the object image triplet comprising an anchor object image and a positive object image of the same object and a negative object image of a different object; and
      retraining the neural network using the object image triplet of the sequences of object images, wherein the retraining the neural network comprises:
      for each object image triplet,
         separately inputting the anchor object image, the positive object image, and the negative object image of the object image triplet into the neural network to obtain correspond output anchor, positive, and negative feature vectors,
         computing a triplet loss function value based on the anchor, positive, and negative feature vectors, and
      computing a variance of the triplet loss functions; and
      when the variance of the triplet loss functions is greater than a threshold, retraining the neural network using the anchor, positive, and negative feature vectors of the sequences of object images.

9. The system of claim 8 further comprising capturing the one or more video streams using one or more video cameras over a same period of time, each video camera capturing views of the one or more objects at a different location.

10. The system of claim 8 wherein forming the one or more sequences of object images comprises for each video stream, using object detection to identify an object in each video frame of the video stream;
performing object tracking to track each object captured in the video stream from one video frame of the video stream to a next video frame of the video stream;
for each object captured in the video stream, using object image extraction to extract a cropped object image from each video frame of the video stream; and
form a sequence of cropped object images from the extract object images for each object captured in the video stream.

11. The system of claim 8 wherein forming the object image triplet for each of the one or more sequences of object images comprises:
selecting a first object image from the sequence of object images, wherein the first object image is the anchor object image;
computing a distance between the anchor object image and each of the images of the sequence of object images;
identifying the image with a largest distance from the anchor object image as the positive object image; and
form the negative object image from a second object image of object that is different from the object in the sequence of object images.

12. The system of claim 8 further comprises initially training the neural network using a labelled set of object images.

13. The system of claim 8 wherein retraining the neural network using the triplet feature vectors of the sequences of objects images for a fixed number of iterations.

14. The system of claim 8 further comprises:
inputting object images of objects whose object images are in the labelled object image data set to the neural network to obtain corresponding feature vectors;
computing an average fraction of correct matches as a measure of how well the neural network of the object recognition system is performing;
computing a variance of the average fraction of correct matches; and
when the variance of the average fraction of correct matches is greater than a threshold, retraining the neural network using the object images in the labelled object image data set.

15. A non-transitory computer-readable medium encoded with machine-readable instructions that implement a method carried out by one or more processors of a computer system to perform the operations of
retrieving one or more video streams from the one or more data-storage devices, each video stream capturing one or more views of one or more objects;
forming one or more sequences of object images, each sequence of object images corresponding to one of the one or more objects;
forming an object image triplet for each sequence of object images, the object image triplet comprising an anchor object image and a positive object image of the same object and a negative object image of a different object; and
retraining the neural network using the object image triplet of the sequences of object images, wherein the retraining the neural network comprises:
for each object image triplet,
separately inputting the anchor object image, the positive object image, and the negative object image of the object image triplet into the neural network to obtain correspond output anchor, positive, and negative feature vectors,
computing a triplet loss function value based on the anchor, positive, and negative feature vectors, and
computing a variance of the triplet loss functions; and
when the variance of the triplet loss functions is greater than a threshold, retraining the neural network using the anchor, positive, and negative feature vectors of the sequences of object images.

16. The medium of claim 15 further comprising capturing the one or more video streams using one or more video cameras over a same period of time, each video camera capturing views of the one or more objects at a different location.

17. The medium of claim 15 wherein forming the one or more sequences of object images comprises for each video stream,
using object detection to identify an object in each video frame of the video stream;
performing object tracking to track each object captured in the video stream from one video frame of the video stream to a next video frame of the video stream;
for each object captured in the video stream, using object image extraction to extract a cropped object image from each video frame of the video stream; and
form a sequence of cropped object images from the extract object images for each object captured in the video stream.

18. The medium of claim 15 wherein forming the object image triplet for each of the one or more sequences of object images comprises:
selecting a first object image from the sequence of object images, wherein the first object image is the anchor object image;
computing a distance between the anchor object image and each of the images of the sequence of object images;
identifying the image with a largest distance from the anchor object image as the positive object image; and
form the negative object image from a second object image of object that is different from the object in the sequence of object images.

19. The medium of claim 15 further comprises initially training the neural network using a labelled set of object images.

20. The medium of claim 15 wherein retraining the neural network using the triplet feature vectors of the sequences of objects images for a fixed number of iterations.

21. The medium of claim 15 further comprises:
inputting object images of objects whose object images are in the labelled object image data set to the neural network to obtain corresponding feature vectors;
computing an average fraction of correct matches as a measure of how well the neural network of the object recognition system is performing;
computing a variance of the average fraction of correct matches; and
when the variance of the average fraction of correct matches is greater than a threshold, retraining the neural network using the object images in the labelled object image data set.

* * * * *